No. 670,674.
Patented Mar. 26, 1901.
M. C. HUTCHINGS.
HAY STACKER AND DERRICK.
(Application filed Nov. 14, 1900.)
(No Model.)
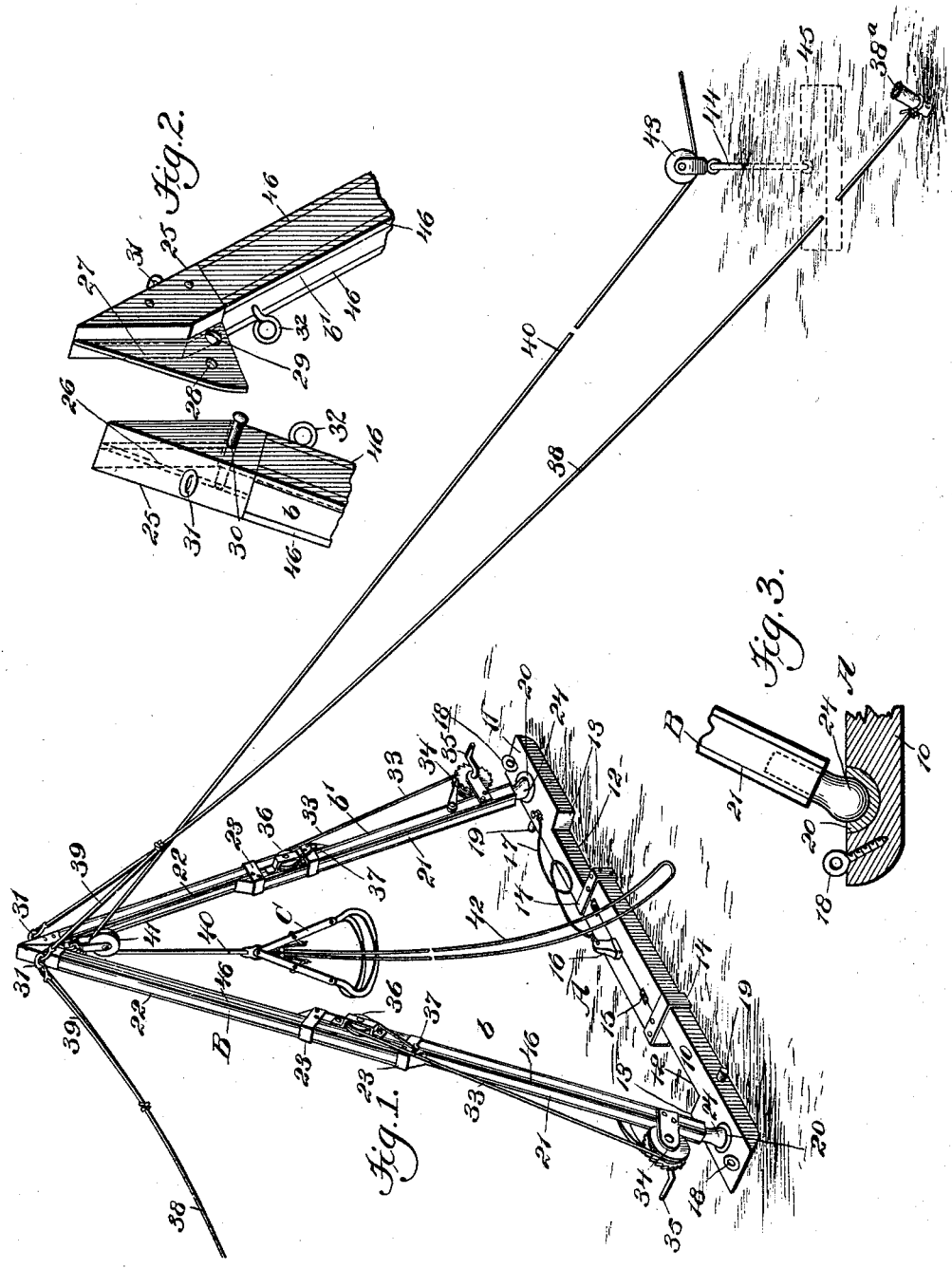
WITNESSES:
INVENTOR
Marvin C. Hutchings
BY
ATTORNEYS

UNITED STATES PATENT OFFICE.

MARVIN CARLETON HUTCHINGS, OF BOZEMAN, MONTANA, ASSIGNOR OF ONE-HALF TO JOSEPH PHILO JEFFRIES, OF SAME PLACE.

HAY-STACKER AND DERRICK.

SPECIFICATION forming part of Letters Patent No. 670,674, dated March 26, 1901.

Application filed November 14, 1900. Serial No. 36,428. (No model.)

*To all whom it may concern:*

Be it known that I, MARVIN CARLETON HUTCHINGS, a citizen of the United States, and a resident of Bozeman, in the county of Gallatin and State of Montana, have invented a new and Improved Hay-Stacker and Derrick, of which the following is a full, clear, and exact description.

The purpose of the invention is to provide a portable device in the form of a derrick, and which can be employed for hoisting material of any description or a hay-fork or a like agricultural implement, and to so construct the device that its various members can be adjusted and may be held in their adjusted position.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved device. Fig. 2 is a perspective view of the upper portion of the sides of the device, drawn on an enlarged scale, the said sides being shown separated; and Fig. 3 is a vertical section through a portion of the base, illustrating the manner in which the side members of the device have a ball-and-socket connection with the base.

A represents the base of the derrick. This base is usually constructed in two members 10 and 11, and in the opposing faces of the said members 10 and 11 longitudinal recesses 12 are produced, forming end shoulders 13, so that the two sections may slide in engagement with each other, and when the sections are carried inward to their full extent the ends of the sections will engage with the shoulders 13 of the opposing sections and the base will be as wide at its center as at its ends. Straps 14 are attached to the end portions of the sections 10 and 11 of the base, extending loosely around the opposing sections, and these straps 14 serve as guides for the two sections when they are drawn out one from the other or carried inward in direction of each other. In the opposing faces of the two sections 10 and 11 of the base vertical recesses 15 are produced, and these recesses in the two sections of the base are adapted at times to be brought into registry, and when in register a key 16 is passed down through the registering recesses 15, as shown in Fig. 1, and this key serves to lock the sections of the base A in the position to which they may be adjusted. This key 16 is shown attached to the base by a rope, cord, or chain 17. At each end of the base an eye 18 is located, to which a team may be hitched for the purpose of drawing the device from one point to another, and preferably the outer end portions of the base are given an upward inclination or curvature, as shown in Figs. 1 and 3. The sections of the base A are provided with outwardly-projecting pins 19, which constitute handles and enable operators to readily adjust the sections of the base, and in the upper surface of each section of the base, near its outer end, a socket 20 is formed. This socket is semicircular, as shown in Fig. 3, and is usually provided with a metal lining, as is also shown in both Figs. 1 and 3.

The derrick B consists of two side sections $b$ and $b'$, and each of said side sections $b$ and $b'$ consists, preferably, of two members 21 and 22, mounted to slide one upon the other, being guided in their sliding movement by suitably-applied straps 23, and at the lower end of the lower member of each side section of the derrick a foot 24 is located, having a cylindrical or circular lower surface adapted to fit and turn in the sockets 20 in the base and heretofore described. The upper ends of the upper members 22 of the side sections of the derrick are made straight at their inner faces, so that these two faces may fit snugly together, while the said sections are at a decided inclination to the base, and the upper ends of the upper members of the side sections of the base are preferably provided with metal caps or casings 25. In the inner face of the upper member of one section of the derrick a vertical recess 26 is produced, adapted to receive a fin or plate 27, which extends from the corresponding portion of the opposing upper member of the opposite section, as shown in Fig. 2. This fin or plate 27 is provided, preferably near its bottom portion, with two apertures 28 and 29, the aperture 28 being shown smaller than the aperture 29, and said aperture 29 is near the inner face of the derrick-section to which the plate or fin 27 belongs. When the plate or fin 27 has been made to enter the recess or slot 26, a pin 30 is passed through the aperture 28 of the said fin or plate, the said pin being carried by the receiving-section of the derrick. In this manner the upper portions of the sections of the derrick may be securely and quickly fastened together. The aperture 29 is adapted for a purpose to be hereinafter described.

Upon the outer face of the cap 25 of each section of the derrick B an eye 31 is formed, adapted to receive guy-ropes, to be hereinafter described, and likewise eyes 32 may be and preferably are attached to the inner faces of the said side sections of the derrick, near their upper ends, as illustrated in Fig. 2, and these eyes 32 may be utilized to receive the upper ends of a rope ladder, which will enable a person to readily ascend to the top portion of the derrick to attach or to adjust the guy-ropes mentioned or for other purposes.

The members of the side sections of the derrick B are raised and lowered, preferably, through the medium of cords, ropes, or chains 33, which at their lower ends are secured to drums 34, carried by the lower members of the side sections of the derrick, and said drums are turned through the medium of attached crank-handles 35 or their equivalents. Each drum is also preferably provided with a ratchet-wheel engaged by a pawl pivoted upon the lower members of the side sections of the derrick, as is clearly illustrated in Fig. 1. These ropes, cords, or chains 33 are passed over pulleys 36, which are supported upon the upper portions of the lower members of the side sections of the derrick, and the upper ends of the ropes, cords, or chains 33 are attached to the lower portions of the upper members of the side sections of the derrick through the medium of pins 37 or their equivalents. Thus it will be observed that by manipulating the drums 34 the members of the side sections of the derrick may be raised or lowered, as occasion may demand.

Guy-ropes 38 extend from opposite sides of the derrick B, and these guy-ropes 38 at their lower ends are usually attached to stakes 38$^a$, driven in the ground. Each guy-rope at its upper end is bifurcated, and the members 39 of the guy-ropes at their upper ends are attached to the eyes 31, heretofore referred to, one at each side of the derrick, so that the derrick is equally braced at the top from each side and at the front and at the rear. A hoist-rope 40 is passed over a pulley 41, which is connected with the plate or fin 27 at the aperture 29, heretofore mentioned, and the hoist-rope 40, after passing over the pulley 41, may be attached to a hay-fork C, for example, which is shown as provided with a suitable trip-rope 42, extending to the ground, or this inner end of the hoist-rope may be connected with a sling, a platform, or with any device necessary in hoisting material of different kinds.

The hoist-rope 40 is passed over a sheave 43, and if this sheave cannot be attached to a near-by permanent support it is connected by a link 44 or its equivalent with a block 45, which block is buried in the ground a suitable distance to afford a proper support for the sheave. When the device is employed for stacking hay, the sheave should be anchored at the opposite side of the stack from the load and far enough away not to interfere with shaping the stack.

In order to protect the sections of the derrick from wearing in adjustment, angle-irons 46 or metal wear-plates are secured to the sections where they contact.

Having thus described my invention, I claim as new and desire to secure by Letters Patent—

1. The combination of a base constructed in adjustable sections, a locking device for the said sections, sockets formed in the upper surfaces of the said sections, side sections having cylindrical lower extremities mounted to turn in the sockets of the base, the side sections being constructed in members mounted to slide one upon the other, means for connecting the upper members of the side sections, a hoisting device for the upper members of the side sections, guy-ropes having bifurcated upper ends and extending from the front and back of the side sections, corresponding members of the bifurcated portions of the guy-ropes being connected at the same side of the said side members and adjacent to each other, for the purpose set forth.

2. The combination of a base constructed in adjustable sections, a locking device for the said sections, sockets formed in the upper surfaces of the said sections, side sections having cylindrical lower extremities mounted to turn in the sockets of the base, the side sections being constructed in members mounted to slide one upon the other, means for connecting the upper members of the side sections, a hoisting device for the upper members of the side sections, guy-ropes having bifurcated upper ends and extending from the front and back of the side sections, corresponding members of the bifurcated portions of the guy-ropes being connected at the same side of the said side members and adjacent to each other, a pulley suspended between the upper portion of the upper members of the side sections, a hoist-rope carried over said pulley, and an outside guide for the hoist-rope, as described.

3. The combination, with a base constructed in sections mounted to slide in engagement with each other, the inner faces of the said sections having recesses therein, a locking device for the sections of the base, and sockets formed in the upper faces of the base-sections near their ends, of side sections provided with cylindrical feet adapted to enter and turn in the said sockets, each side section comprising two members mounted to slide one upon the other, drums mounted on the lower members of the side sections, ratchet-and-pawl mechanism for the said drums, ropes attached to the drums, which ropes pass over guide-pulleys carried by the members of the side sections with which the drums are connected, the upper ends of which ropes are connected with the lower portions of the upper members of the side sections, a tongue-and-groove connection between the upper portion of the upper members of the side sections, a locking-pin passed through said connection, a pulley suspended from the upper portion of the side sections between the upper members thereof, the said upper portion of the said upper members of the side sections being provided with eyes at opposite sides, and guy-ropes located at the front and rear of the structure, having their upper ends bifurcated and the members thus formed connected with the said eyes, as and for the purpose described.

4. In a derrick, the combination of a base, comprising two longitudinally-adjustable sections, and two side sections each formed of longitudinally-adjustable members, the lower of which members are stepped rockably on the respective sections of the base, and the upper of which members are rigidly connected together at their upper ends.

In testimony whereof I have signed my name to this specification in the presence of two subscribing witnesses.

MARVIN CARLETON HUTCHINGS.

Witnesses:
BENJ. F. OSBORN,
J. A. MCELROY.